(12) United States Patent
van Dam et al.

(10) Patent No.: US 8,267,654 B2
(45) Date of Patent: Sep. 18, 2012

(54) WIND TURBINE WITH GUST COMPENSATING AIR DEFLECTOR

(75) Inventors: Cornelis P. van Dam, Davis, CA (US); Kevin Lee Jackson, Winters, CA (US)

(73) Assignee: Frontier Wind, LLC, West Conshohocken, PA (US)

( * ) Notice: Subject to any disclaimer, the term of this patent is extended or adjusted under 35 U.S.C. 154(b) by 1015 days.

(21) Appl. No.: 12/122,584

(22) Filed: May 16, 2008

(65) Prior Publication Data
US 2009/0284016 A1    Nov. 19, 2009

(51) Int. Cl.
F03D 7/06    (2006.01)
B64C 9/32    (2006.01)

(52) U.S. Cl. ............... 416/14; 416/24; 416/41
(58) Field of Classification Search ............ 244/17.25, 244/99.5, 99.6, 206, 214; 416/14, 23, 24, 416/31, 32, 33, 36, 40, 41, 42, 44, 62, 135
See application file for complete search history.

(56) References Cited

U.S. PATENT DOCUMENTS

| | | | |
|---|---|---|---|
| 1,790,309 A | | 1/1931 | Kientz |
| 2,076,520 A | * | 4/1937 | Swanson ............ 416/132 R |
| 2,485,543 A | | 10/1949 | Andreau |
| 2,503,585 A | * | 4/1950 | Loedding ............ 244/214 |
| 2,622,686 A | | 12/1952 | Chevreau et al. |
| 2,951,662 A | | 9/1960 | Theodorsen |
| 4,341,176 A | | 7/1982 | Orrison |
| 4,575,309 A | | 3/1986 | Brown |
| 4,582,278 A | | 4/1986 | Ferguson |
| 4,692,095 A | | 9/1987 | Lawson-Tancred |
| 5,106,265 A | | 4/1992 | Holzem |
| 5,181,678 A | | 1/1993 | Widnall et al. |
| 5,433,404 A | | 7/1995 | Ashill et al. |
| 5,456,579 A | | 10/1995 | Olson |
| 5,527,152 A | | 6/1996 | Coleman et al. |
| 5,531,407 A | | 7/1996 | Austin et al. |

(Continued)

FOREIGN PATENT DOCUMENTS

GB    2185788 A    7/1987

(Continued)

OTHER PUBLICATIONS

Office action for U.S. Appl. No. 12/464,447 mailed Oct. 11, 2011.

(Continued)

*Primary Examiner* — Edward Look
*Assistant Examiner* — Jason Davis
(74) *Attorney, Agent, or Firm* — Banner & Witcoff, Ltd.

(57) ABSTRACT

An apparatus and system for counteracting wind gusts and other high load situations in a wind turbine includes the use of one or more gust counteracting devices configured to extend an air deflector outwardly from a surface of a turbine rotor blade. The air deflector may subsequently be retracted into the rotor blade once the wind gust has subsided or once the load falls below a certain threshold. Mechanisms for extending and retracting the air deflector may include pneumatic or hydraulic systems and/or electromechanical devices. Air deflectors are generally configured to normalize air flow around the rotor blade so that the risk of potential damage to components of the wind turbine is minimized. In one arrangement, the gust counteracting device may be located at a leading section of the turbine blade. Additionally or alternatively, the device may be modular in nature to facilitate the removal and replacement of the device.

21 Claims, 15 Drawing Sheets

U.S. PATENT DOCUMENTS

| | | | |
|---|---|---|---|
| 6,010,098 | A | 1/2000 | Campanile et al. |
| 6,045,096 | A | 4/2000 | Rinn et al. |
| 6,149,105 | A * | 11/2000 | Jaggard .................... 244/214 |
| 6,465,902 | B1 | 10/2002 | Beauchamp et al. |
| 6,619,918 | B1 * | 9/2003 | Rebsdorf .................... 416/1 |
| 6,902,370 | B2 * | 6/2005 | Dawson et al. .............. 415/4.1 |
| 6,940,185 | B2 | 9/2005 | Andersen et al. |
| 7,028,954 | B2 * | 4/2006 | Van Dam et al. ............ 244/204 |
| 7,029,235 | B2 | 4/2006 | Liang |
| 7,192,245 | B2 | 3/2007 | Djeridane et al. |
| 7,204,674 | B2 | 4/2007 | Wobben |
| 7,293,959 | B2 * | 11/2007 | Pedersen et al. ............. 416/23 |
| 7,387,491 | B2 | 6/2008 | Saddoughi et al. |
| 7,419,356 | B2 * | 9/2008 | Stiesdal .................... 416/1 |
| 2002/0074459 | A1 * | 6/2002 | Gleine et al. ................. 244/214 |
| 2003/0218102 | A1 | 11/2003 | Van Dam et al. |
| 2003/0223868 | A1 | 12/2003 | Dawson et al. |
| 2006/0145483 | A1 | 7/2006 | Larsen et al. |
| 2008/0240923 | A1 | 10/2008 | Bonnet |
| 2008/0292461 | A1 | 11/2008 | Stiesdal |
| 2009/0285682 | A1 * | 11/2009 | Baker et al. .................... 416/1 |
| 2011/0223022 | A1 | 9/2011 | Wang et al. |

FOREIGN PATENT DOCUMENTS

| | | |
|---|---|---|
| WO | 02/29247 A1 | 4/2002 |
| WO | 2004/099608 A1 | 11/2004 |
| WO | 2007045940 A1 | 4/2007 |

OTHER PUBLICATIONS

Notice of Allowance for U.S. Appl. No. 12/464,447 mailed Jan. 26, 2012.

Extended European Search Report for EP Application No. 09251327.4-1267 mailed Mar. 27, 2012.

* cited by examiner

WIND TURBINE WITH GUST COMPENSATING AIR DEFLECTOR

TECHNICAL FIELD

The invention relates generally to the design and control of a wind turbine. More specifically, the invention relates to modifying the aerodynamics of a wind turbine blade.

BACKGROUND

Wind turbines create power proportional to the swept area of their blades. The choice of rotor attributes for a wind turbine, such as its diameter, is a design trade-off between longer blades for more energy production in low winds and shorter blades for load limitation in high winds. Thus, wind turbine having longer blades will increase the swept area, which in turn produces more power. However, at high wind speeds, a wind turbine having longer blades places greater demands on the components and creates more situations where the turbine must be shut down to avoid damaging components. Even in situations where the average wind speed is not high enough to cause damage, periodic wind gusts which change both the speed and direction of the wind, apply forces that may be strong enough to damage equipment.

Approaches with varying levels of success have been attempted in achieving higher power, fewer shut downs, and less instances of damage to components. For example, pitch control has been used to vary the pitch of the blade (i.e., the angle of the blade). On a pitch controlled wind turbine, an electronic controller on the turbine checks the power output of the turbine. When the power output exceeds a certain threshold, the blade pitch mechanism turns the rotor blades to reduce the loads on the rotor blades. The blades are later turned back when the wind drops again. However, pitch control can be fairly slow to respond to changes in the wind and is relatively ineffective to loads imparted by sudden wind gusts.

Stall control is another approach that has been used in an attempt to achieve higher power, and to reduce shut downs and damage to components. In passive-type stall controlled wind turbines, the rotor blades are mounted to the hub at a fixed angular orientation. The stall control is achieved passively by the shape of the blade being such that the blade goes into aerodynamic stall (destroying lift) when the wind speed exceeds a certain threshold. Active-type stall controlled wind turbines exist. In such systems, the rotor blades are adjusted in order to create stall along the blade. However, both types of stall control systems can be difficult to optimize and slow to respond, and may suffer from lower predictability of results than desired. These drawbacks are magnified in conditions with erratic winds and wind gusts.

Variable length rotor blade systems have also been used as an attempt to achieve higher power, and experience fewer shut downs and less damage to components. In such systems, the wind turbine rotor blades are telescopic so that their length can be adjusted based on the wind speed. Such provides advantages in that the rotor blades can be extended to provide higher output in low wind conditions and retracted to lower loads in high wind conditions. U.S. Pat. No. 6,902,370 discloses a wind turbine system having telescoping wind turbine rotor blades. While variable length rotor blade systems have certain advantages, they may suffer drawbacks in erratic wind conditions or may be too slow to respond when experiencing a wind gust.

As electricity continues to become a more valuable commodity, and as wind turbines present an environmentally-friendly solution to solve electricity shortage problems, a wind turbine design that overcomes the aforementioned drawbacks and provide increased power and decreased turbine shut downs and damage to components is thus desirable.

BRIEF SUMMARY

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, the present invention is directed to a device and system for counteracting sudden increases in load or changes in operating environment such as when a gust suddenly increases the magnitude of the wind or changes the direction of the wind experienced by a wind turbine rotor.

A first aspect of the invention provides a wind turbine including an airfoil rotor blade having an air deflector. The air deflector may be configured to extend from an exterior surface of the airfoil rotor blade when a change in load or wind gust magnitude or angle is detected. In this way, the air deflector acts to counteract such changes. In one arrangement, the air deflector may be located on a leading side of the airfoil rotor blade as defined by a leading edge and a trailing edge of the blade. For example, the leading edge and surface may correspond to an edge or surface of the airfoil rotor blade closest to an origin of the wind. The air deflector may further be moved to a retracted position in normal operating conditions (e.g., when a load is not excessive) such that the air deflector does not extend outwardly from the surface of the airfoil rotor blade.

A second aspect of the invention provides a wind turbine including an airfoil rotor blade that is telescopically extendable and having at least one air deflector. To counteract excessive loads and other environmental factors, the airfoil rotor blade may be extended or retracted in conjunction with the extension or retraction of at least one air deflector. For example, when a sudden change occurs, the air deflector may be activated since the air deflector may be extended very quickly. For more gradual changes, extension or retraction of the blade may be used since quick compensation is not as critical. In other arrangements, the air deflector may be extended to further reduce loads in cases where the airfoil rotor blade has been retracted as much as possible.

A third aspect of the invention provides a wind gust or load counteracting module connected to an airfoil blade. The counteracting module may include an air deflector, a controller for controlling the extension and retraction of the air deflector and a sensor configured to sense various conditions. In one or more configurations, an airfoil blade may include multiple counteracting modules, each including an air deflector, a controller and a sensor. Use of modules may facilitate the removal, insertion or replacement of air deflectors or other components associated therewith out having to modify the entire airfoil blade.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Aspects of the present invention are directed to a deployable device and combinations of its attributes that may be mounted to a rotor blade in various applications to quickly assist in counteracting wind gusts. In addition, aspects of the present invention are directed to a rotor blade having the deployable device, and to a wind turbine with a rotor blade having the deployable device.

Figure 1:
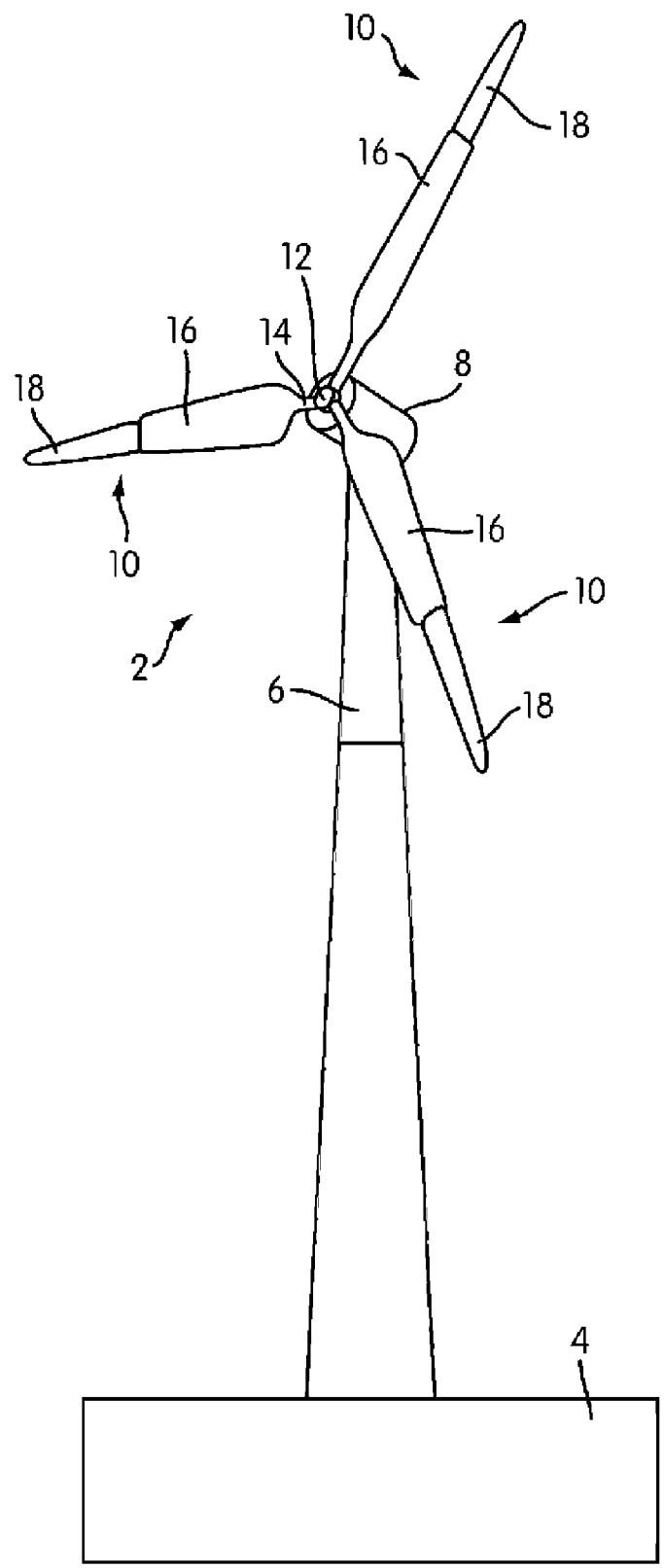
FIG. 1 is a perspective view of a wind turbine according to a first embodiment of the invention.

FIG. 1 shows a wind turbine 2 on a foundation 4 with a tower 6 supporting a nacelle 8. One or more blades 10 are attached to a hub 12 via a bolt flange 14. In the depicted embodiment, the wind turbine includes three blades 10. The hub 12 is connected to a gear box, a generator, and other components within the nacelle 8. The blades 10 may have a fixed length or may be of the variable length-type, i.e., telescopic, such as shown in FIG. 1. As shown in FIG. 1, each variable length blade 10 includes a root or base portion 16 and a tip portion 18. The tip portion 18 is movable with respect to the root portion 16 so as to controllably increase and decrease the length of the rotor blade 10, and in turn, respectively increase and decrease the swept area of the rotor blades 10. Any desirable drive system, such as a screw drive, a piston/cylinder, or a pulley/winch arrangement may be used to move the tip portion 18 with respect to the root portion 16. Such drive systems are described in U.S. Pat. No. 6,902,370, which is hereby incorporated by reference. The wind turbine 2 further includes a yaw drive and a yaw motor, not shown.

FIGS. 2-5 show a cross section of a wind turbine blade 10 containing at least one gust counteracting device 30. The blade 10 has a leading edge 20, a trailing edge 22, a high pressure side 24 and a low pressure side 26. A chord line c can be defined as a line between the leading edge 20 and trailing edge 22 of the blade 10. It is recognized that the leading side of the rotor blade 10 corresponds to the leading half of the rotor blade 10 and the trailing side of the rotor blade 10 to the trailing half of the rotor blade 10.

The blade 10 depicted in the figures is merely one illustrative cross-sectional design and it is recognized that infinite cross-sectional variations can be used as part of the present invention. The airfoil rotor blade may be made of any suitable construction and materials, such as fiberglass and/or carbon fiber.

Figure 2:
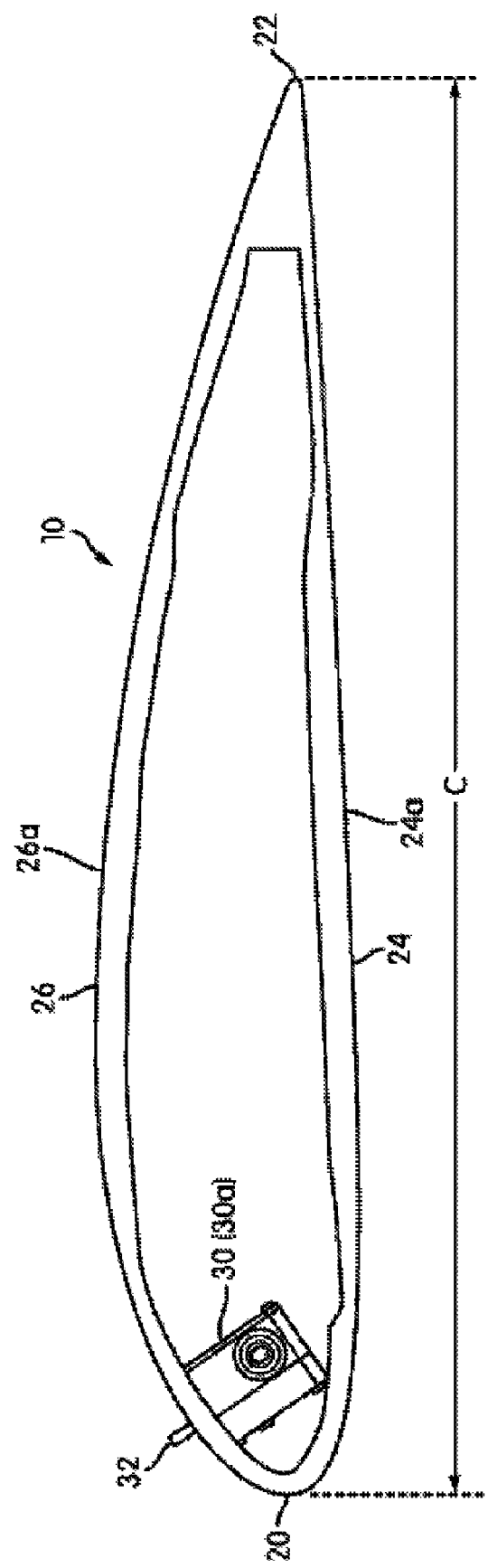
FIG. 2 is a cross-section through the rotor blade depicting a first wind gust counteracting device with the air deflector in an extended position.
Figure 3:
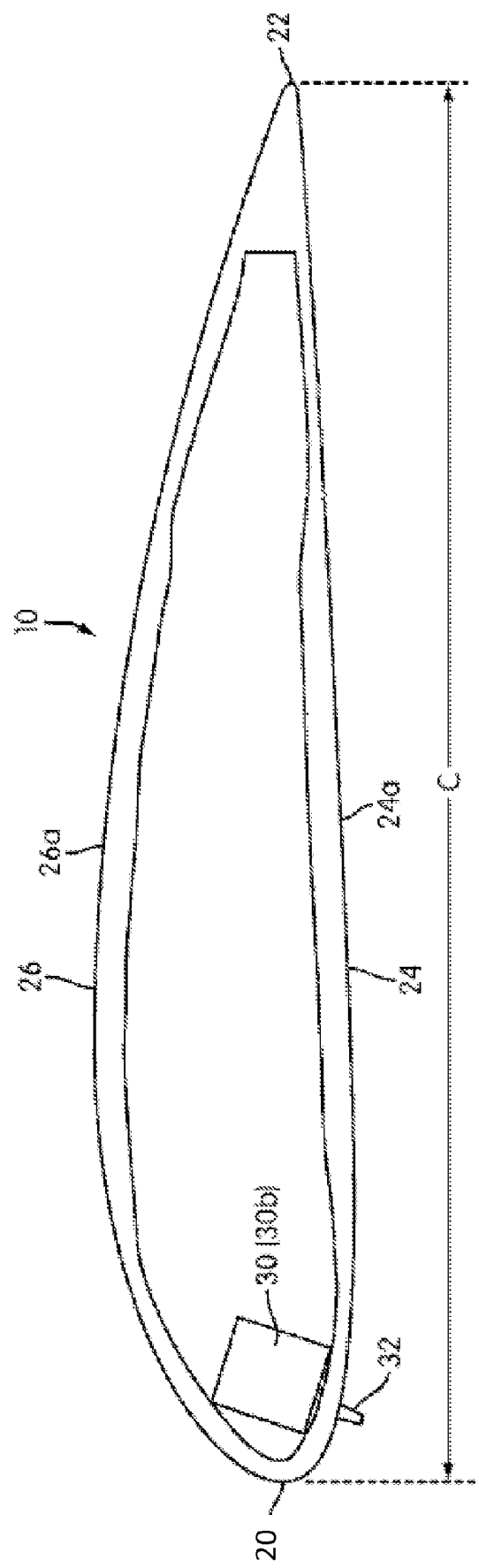
FIG. 3 is a cross-section through the rotor blade depicting a second wind gust counteracting device with the air deflector in an extended position.

As can be seen in cross sections of FIGS. 2 and 3, the rotor blade 10 further includes at least one gust counteracting device, generically referenced to as reference number 30, but specifically referred to as reference number 30a and 30b with reference to a specific side of the rotor blade 10. FIG. 2 depicts a placement of a first wind gust counteracting device 30a to affect the airflow on the low pressure side 26 of the rotor blade 10. FIG. 3 depicts a placement of a second wind gust counteracting device 30b to affect the airflow on the high pressure side 24 of the rotor blade 10. It is recognized that in use, the more curved surface 26a and the opposing less curved surface 24a create the dynamics of the low pressure side 26 and the high pressure side 24 due to well known principles of aerodynamics. This, in combination with the airflow over the rotor blade 10, creates an effect known as "lift" that assists in the rotation of the rotor.

In one embodiment, each rotor blade 10 includes at least one first wind gust counteracting device 30a to affect the airflow on the low pressure side 26 and at least one second wind gust counteracting device 30b to affect the airflow on the high pressure side 24. That is, it includes wind gust counteracting devices 30a and 30b, and these devices 30a, 30b may be longitudinally spaced along the rotor blade 10. Any desired number of these devices 30a, 30b may be used. In another embodiment, each rotor blade 10 includes at least one wind gust counteracting device 30a to affect the airflow on the low pressure side 26 and no wind gust counteracting devices on the high pressure side 24. Any desired number of the devices 30a may be used on the low pressure side 26. In yet another embodiment, each rotor blade 10 includes at least one wind gust counteracting device 30b on the high pressure side 24 and no wind gust counteracting devices on the low pressure side 26. Any desired number of the devices 30b may be used on the high pressure side 24.

Figure 4:
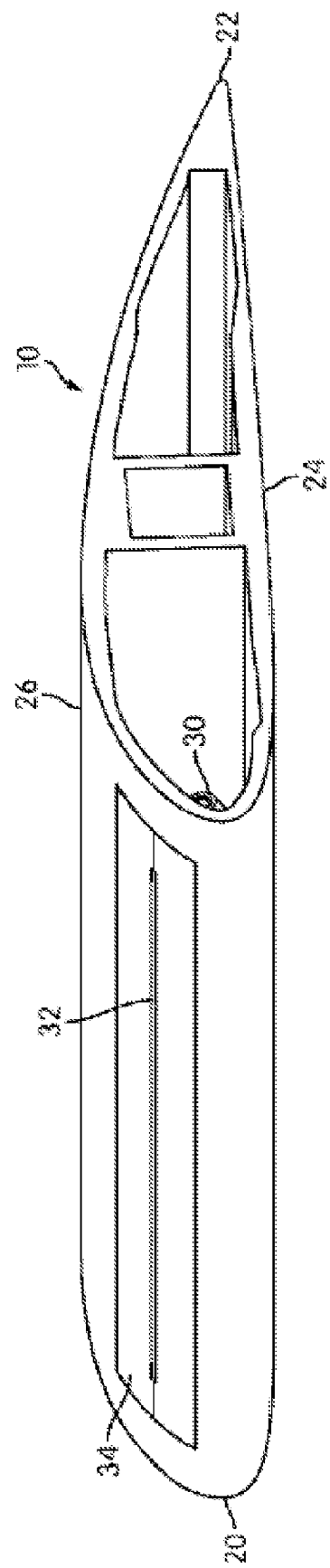
FIGS. 4 and 5 are an isometric sectional views through the rotor blade depicting the wind gust counteracting device of FIG. 2 with the air deflector in a retracted position (FIG. 4) and in an extended position (FIG. 5).

Each wind gust counteracting device 30a, 30b includes an air deflector 32. The air deflector 32 is movable between an extended position in which the air deflector 32 extends from an exterior surface of the airfoil rotor blade 10 and a retracted position in which the air deflector 32 is substantially flush with, recessed, or otherwise does not materially extend from the exterior surface of the airfoil rotor blade 10. FIGS. 2 and 3 both show the air deflector 32 in an extended position wherein the air deflector 32 extends from the exterior surface of the rotor blade 10. FIG. 4 is an isometric sectional view through the rotor blade 10 depicting the wind gust counteracting device 30a.

In a first arrangement, the location of the air deflectors 32 with respect to the leading edge 20 and the trailing edge 22 of the airfoil rotor blade 10 is in the leading half, i.e., is between 0%-50% of the length of the chord c when measured perpendicularly thereto from the leading edge 20 to the trailing edge 22. In another arrangement, the location of the air deflectors 32 with respect to the leading edge 20 and the trailing edge 22 of the airfoil rotor blade 10 is between 5%-25% of the length of the chord c when measured perpendicularly thereto from the leading edge 20 to the trailing edge 22. In yet another arrangement, the location of the air deflectors 32 with respect to the leading edge 20 and the trailing edge 22 of the airfoil rotor blade 10 is between 5%-15% of the length of the chord c when measured perpendicularly thereto from the leading edge 20 to the trailing edge 22.

The air deflector 32 may be sized based on the desired wind turbine condition parameter and further in view of the number of gust counteracting devices used. The air deflector may be made from any suitable material, such as fiberglass, carbon fiber, stainless steel, and/or aluminum. The air deflector 32 may be of any desired width, for example from a few inches to a foot. Additionally, air deflector 32 may extend from the airfoil surface to any desired height, e.g., from less than a percent to a few percent of the chord c (FIG. 3), and they may have any suitable thickness based on the material chosen, typically less than one inch.

Figure 5:
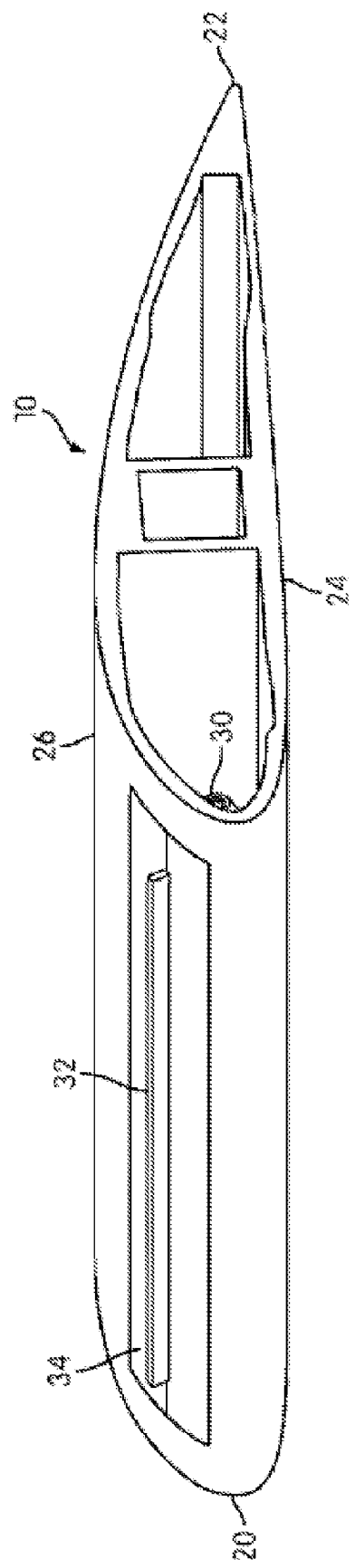

FIGS. 4 and 5 are isometric sectional views through the rotor blade 10 depicting the low pressure side wind gust counteracting device 30 with the air deflector 32 in a retracted position (FIG. 4) and in an extended position (FIG. 5). The wind gust counteracting device 30 is suitably mounted by an interface to substantially maintain the surface contour the rotor blade 10. This may be accomplished by the use of one or more contoured cover plates 34 that fixedly attach to both the gust counteracting device 30 and the blade structure. Alternatively, the leading face of the wind gust counteracting device 30 may be suitably contoured and fixed to the blade structure. In another arrangement, the leading face of the wind gust counteracting device 30 may be mounted to the underside of the blade. Suitable fastening arrangements such as hardware and adhesives may be used.

Figure 6:
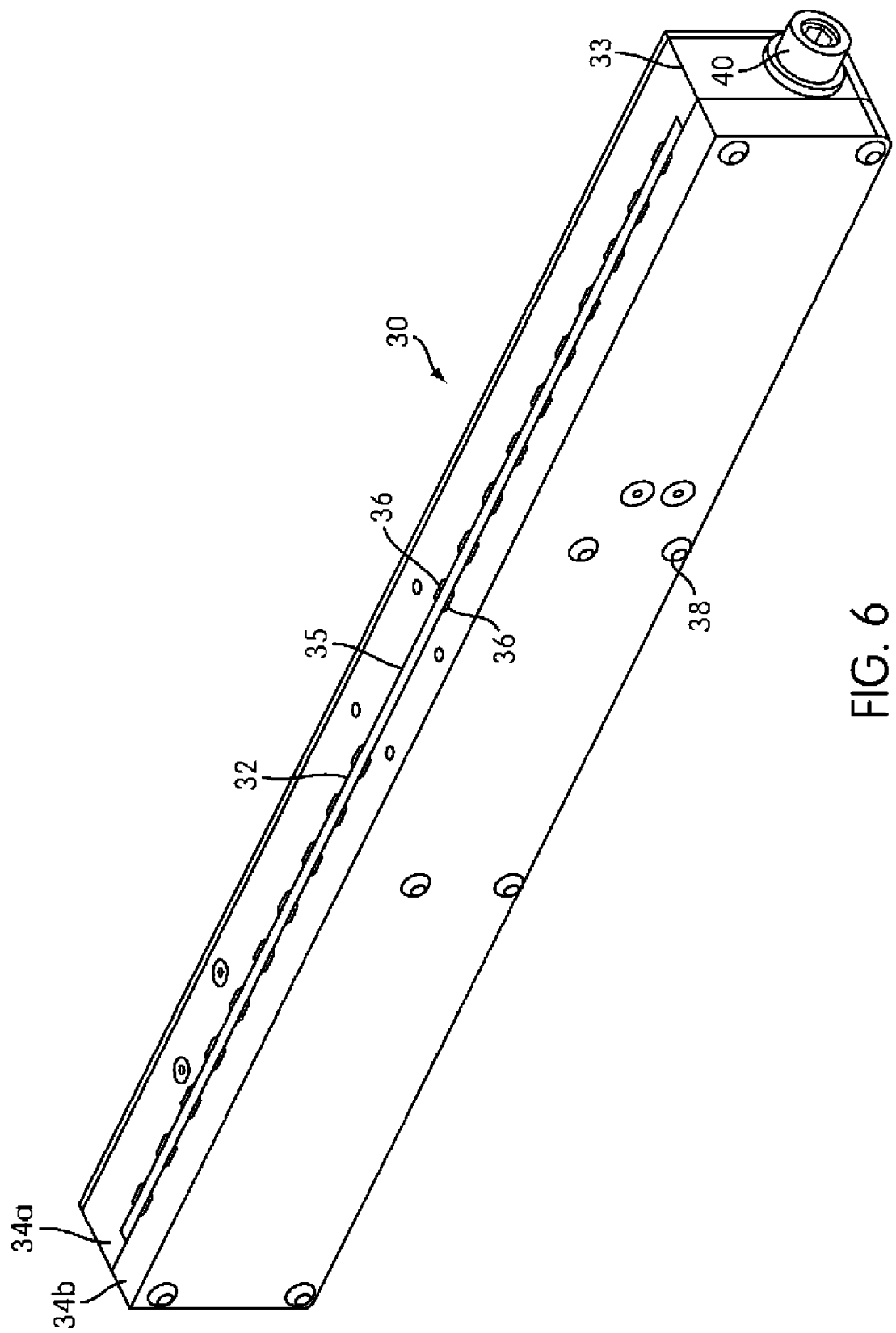
FIGS. 6 and 7 depict isometric views of an illustrative embodiment of a gust counteracting device, in isolation, with the air deflector shown in a retracted position (FIG. 6) and in an extended position (FIG. 7).
Figure 7:
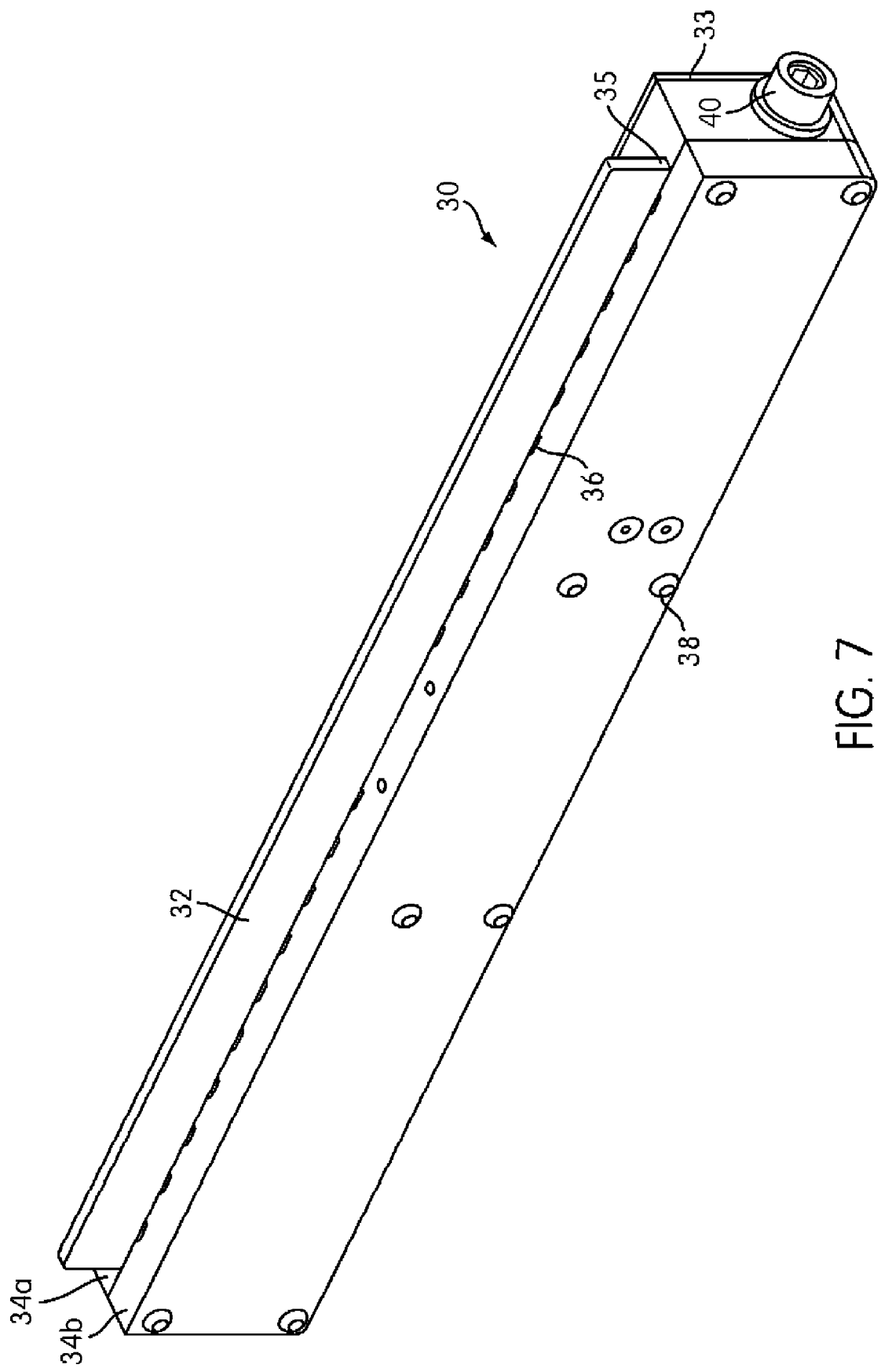

FIGS. 6 and 7 depict isometric views of an illustrative embodiment of a gust counteracting device 30, in isolation, with the air deflector 32 shown in a retracted position (FIG. 6) and in an extended position (FIG. 7). In a first arrangement, the gust counteracting device 30 includes frame 33 made from first and second portions 34a and 34b. The portions 34a and 34b interface so as to define a slot 35 in which the air deflector 32 travels. If desired, the facing edges of the first and second portions 34a and 34b include air exhausts 36. Air exhausts 36 are generally used in pneumatic configurations (i.e., where the air deflector 32 is actuated by pressurized air) to release retained pressurized air, thereby allowing the air deflector 32 to return to an alternate position (e.g., retracted or extended). The operation of air exhausts like exhausts 36 is discussed in further detail below with respect to FIGS. 18a and 18b.

According to one aspect, gust counteracting device 30 may include guide notches (not shown) that act as a track for the air deflector 32. For example, the lower portion of the air deflector 32 may include projections (not shown) that are sized, spaced, and shaped complimentary to the guide notches. The projections may then follow the track corresponding to the notches when the air deflector 32 is extended or retracted. Such an arrangement provides increased alignment and additional structural support. Any desired arrangement, such as screws and other hardware 38, may be used to affix the first and second portions 34a and 34b of the gust counteracting device 30 together. If openings in the rotor blade 10 are accommodated to be the same size, the air deflector 30 and its separate modular characteristic, facilitate easy replacement from potential damage, such as if hit by lightning, or selected replacement for customization purposes. Additionally or alternatively, port 40 may be provided as a fluid conduit coupling, e.g., to connect to a pressurized air source via an air tube or the like.

Figure 8:
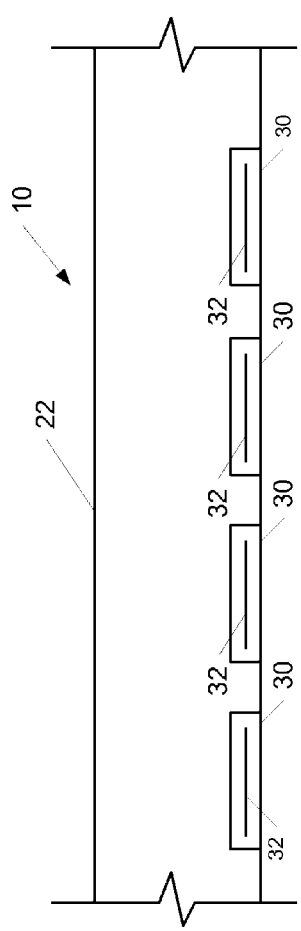
FIG. 8 is a schematic cross section of a rotor blade showing an illustrative spacing arrangement for a series of gust counteracting devices.
Figure 9:
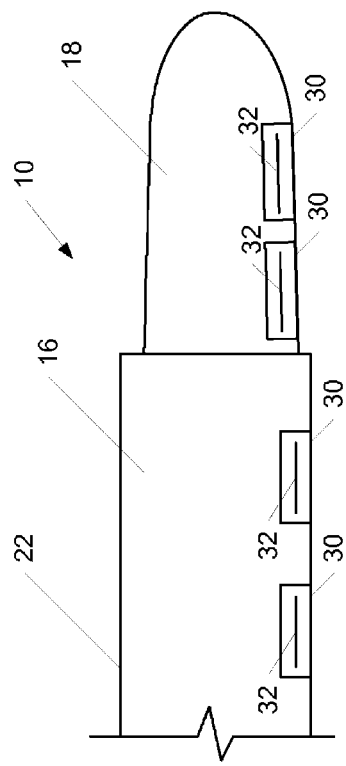
FIG. 9 is a schematic cross section of a longitudinally-telescopic rotor blade showing an illustrative spacing arrangement for a series of gust counteracting devices.

As described above, if more than one gust counteracting device 30 is used on each rotor blade 10, they may be longitudinally spaced along the length of the rotor blade 10 as desired. FIG. 8 depicts an illustrative spacing arrangement for a series of gust counteracting devices 30 with the air deflectors 32. FIG. 9 depicts a longitudinally-telescopic rotor blade 10 showing a series of longitudinally-spaced gust counteracting devices 30 with air deflectors 32 on both the base portion 16 of the rotor 10 and the tip portion 18 of the rotor 10. For each arrangement, and based on space constraints within the rotor blade 10, it may be desirable to longitudinally space the gust counteracting devices 30 at wider intervals so that they may alternate between locations on the high pressure side 24 (FIG. 2) and the low pressure side 26 (FIG. 2).

Figure 10:
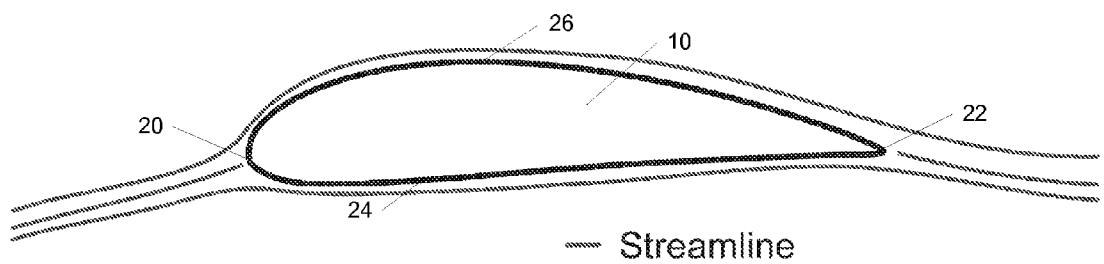
FIG. 10 is a schematic sectional view of a rotor blade representing airflow under normal wind conditions.

The functionality of the gust counteracting device 30a and 30b is generally described herein with respect to FIGS. 10-14. FIG. 10 shows a rotor blade 10 being subjected to airflow under normal wind conditions where the angle of attack of the wind, i.e., the angle between the chord line c and the direction of the relative wind, is within normal desired operating conditions. Such conditions are reflected in the graph of FIG. 14 where the angle of attack is between the lines represented by $\alpha_1$ and $\alpha_2$. In this range, the air deflectors would preferably remain in a retracted position as the wind conditions are achieving the desired lift with low drag. The boundary layer of the air flow on the low pressure side 26 is completely attached. Such may achieve desired operating results under normal wind conditions.

Figure 11:
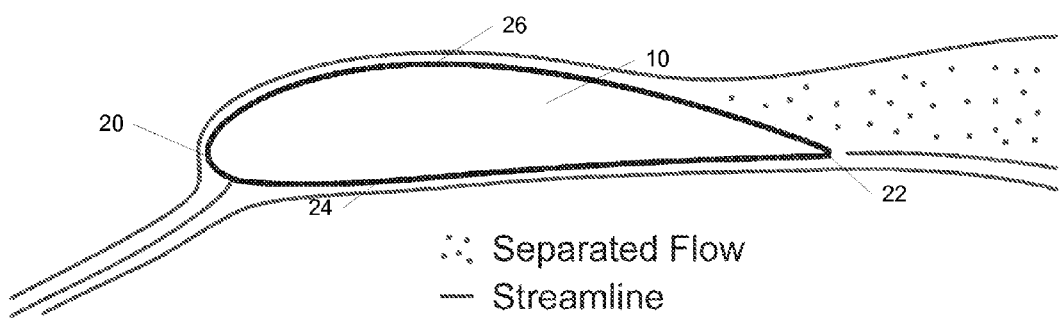
FIG. 11 is a schematic sectional view of a rotor blade representing airflow under a first gust condition.

FIG. 11 shows the rotor blade 10 being subjected to airflow under a gust condition that quickly increases the angle of attack of the wind in excess of $\alpha_1$. This creates increased lift and may exceed desired loads. As described above, this can damage components and force a shut down. The lift and drag characteristics on the rotor blade 10 under these conditions are shown on the graph in FIG. 14 by the line segments to the right of $\alpha_1$ containing point G1.

Figure 12:
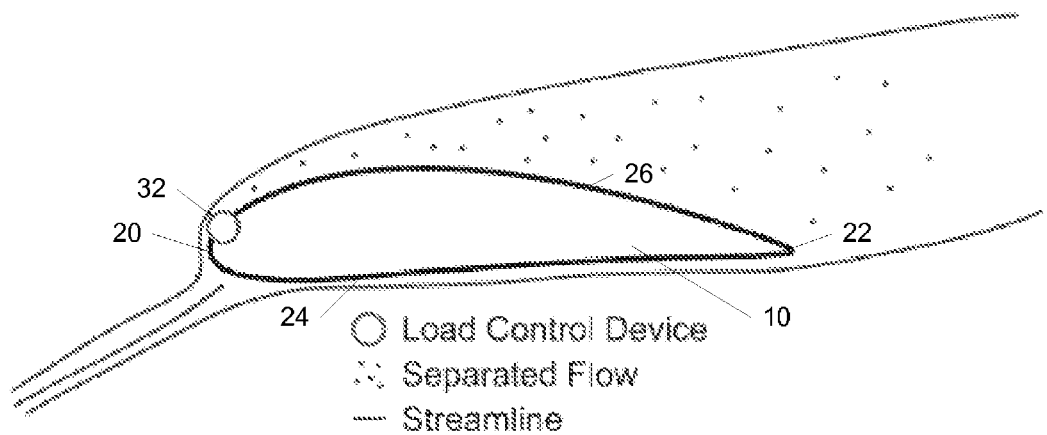
FIG. 12 is a schematic sectional view of a rotor blade representing airflow under a first gust condition schematically depicting a low pressure side air deflector in an extended position and the effect on air flow.

Operation of the gust counteracting device 30a on the low pressure side 26 under these conditions counteracts the negative effects of such a gust. Such effects are shown in FIG. 12. FIG. 12 depicts similar wind conditions relative to the rotor blade as shown in FIG. 11. In FIG. 12, the gust counteracting device 30a (e.g., the load control device) is deployed to move the air deflector 32 to the extended position. This induces upper flow separation adjacent or at a minimum closer to the leading edge 20. This creates a significant increase in drag and a large reduction in lift. Since the gust counteracting device 30a can move the air deflector 32 from the retracted position to the extended position in a fraction of a second, the load on the rotor blade and the other components can likewise be reduced in a fraction of a second to better preserve the equipment and prevent failures.

Figure 14:
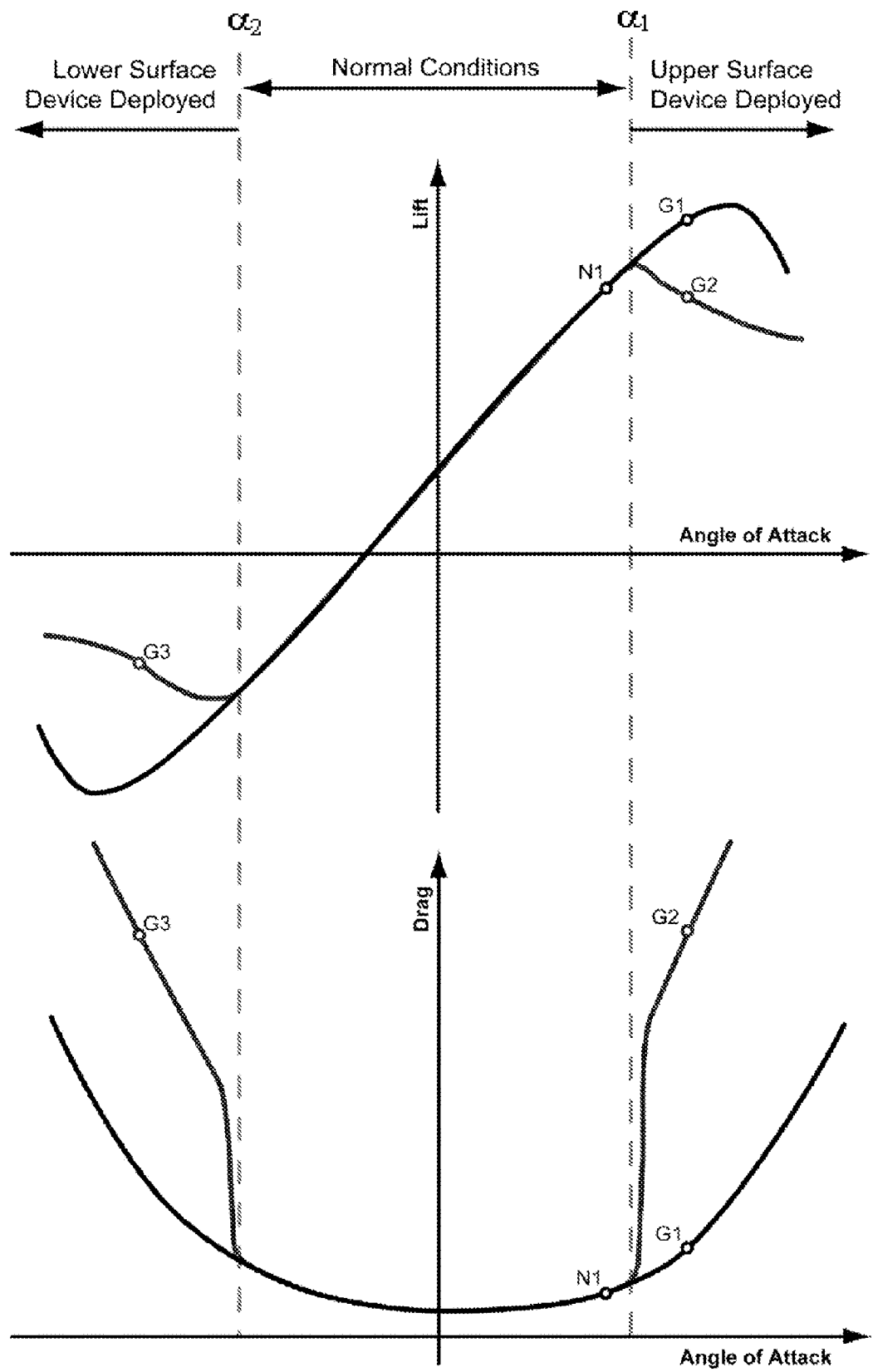
FIG. 14 is a graph depicting the lift and the drag on the rotor blades as a function of the angle of attack of the wind and the operational effects of the position of the air deflectors (deployed or retracted) on the high and low pressure sides of the rotor blades.

The lift and drag characteristics on the rotor blade 10 under these conditions are shown on the graph in FIG. 14 by the line segments to the right of $\alpha_1$ containing point G2. Specifically, the decrease in lift with the extended air deflector 32 is represented by the difference between the line segments to the right of $\alpha_1$ containing point G1 and G2, respectively. Additionally, the increase in drag with the extended air deflector 32 is represented by the difference between the line segments to the right of $\alpha_1$ containing point G2 and G1, respectively. When the angle of attack moves back into normal conditions, the air deflector 32 may be moved back into its retracted position.

Figure 13:
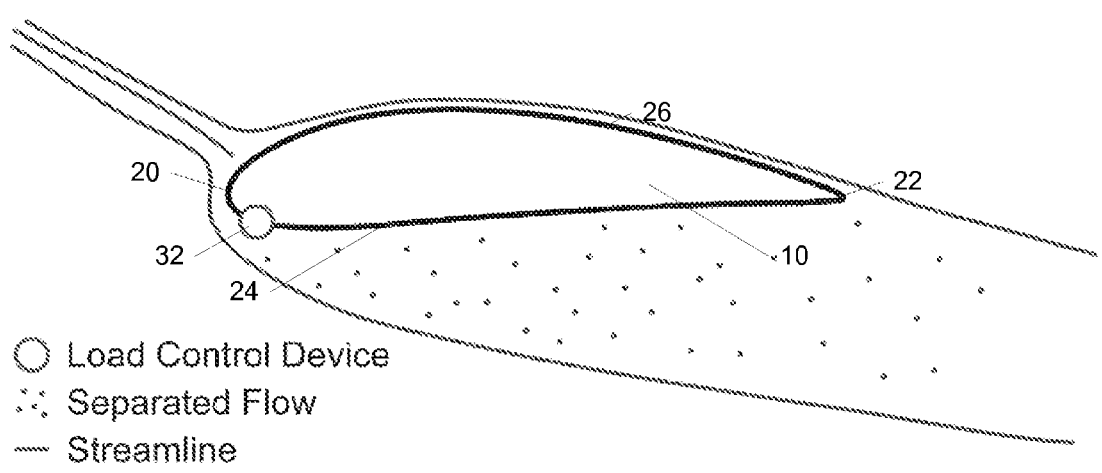
FIG. 13 is a schematic sectional view of a rotor blade representing airflow under an alternative gust condition schematically depicting a high pressure side air deflector in an extended position and the effect on air flow.

FIG. 13 is a schematic sectional view of a rotor blade representing airflow under an alternative gust or wind turbine rotor emergency stop conditions and schematically depicting a high pressure side air deflector 32 in an extended position and the effect on air flow. In the conditions as depicted in FIG. 13, the angle of attack has fallen below $\alpha_2$ (see FIG. 14). Without the deployment of the high pressure side air deflector 32, the lift would continue to decrease as depicted in FIG. 14.

However, when the air deflector 32 on the high pressure side is moved to an extended position, lower surface flow separation is immediately induced. This in turn, increases the drag, but has the effect of reducing the unwanted negative lift. The lift and drag characteristics on the rotor blade 10 under these conditions are shown on the graph in FIG. 14 by the line segments to the left of $\alpha_2$ containing point G3. This offset of the unwanted negative lift reduces the aerodynamic loads on the wind turbine during undesirable wind gust conditions or wind turbine rotor emergency stop conditions. When the angle of attack moves back into normal conditions, the air deflector 32 may be moved back into its retracted position.

The air deflector 32 is beneficial under other gust conditions, such as a sudden increase in wind speed without a change in the angle of attack. By quickly moving the air deflector 32 from the retracted position to the extended position, on either or both the low pressure side 26 (as shown in FIG. 2) or on the high pressure side 24, it alters the shape of the rotor blade 10 around or near the leading edge 20. This in turn drastically changes the lift and drag properties of the blade 10. Thus, a strong wind gust that increases wind velocity and imparts an increased load on the equipment, can be counteracted in a fraction of a second by the deployment of one or more air deflectors 32. Thus, it effectively acts as instantaneous increase of drag, akin to functioning as an air brake.

Any desired drive may be used to move the wind gust counteracting devices 30 can move their respective the air deflector 32 between its extended and retracted position. In an illustrative arrangement in which a fluid such as air is used to control the movement of the air deflectors 32, a centralized source of pressurized air is operatively coupled to a port of the wind gust counteracting devices 30 (e.g., port 40 of FIGS. 6 and 7) via a conduit (e.g., conduit 58 of FIG. 15). Within the wind gust counteracting devices 30, an air pressure actuated solenoid or piston/cylinder and a valve is used to drive the air deflector 32 between its extended and retracted positions. A valve for controlling the flow of pressurized air, e.g., valve 73 of FIGS. 18a and 18b, may be electronically controlled if desired. In one arrangement, the signal to operate the valve and move the air deflector 32 travels via an optical fiber. If desired, a spring may be used to bias the air deflector 32 into either position as a fail safe. While some small amount of electricity may be needed to operate this system, and the power may be from a local source such as a battery or remotely from a conductive wire, this arrangement has advantageous attributes in that it minimizes power consumption and minimizes the likelihood of a lightning strike. It is recognized that alternative drive systems may be used. For example, a spring may be used to bias air deflector 32 into an extended position. To subsequently retract the air deflector 32, a motor may be used. Other electromechanical mechanisms and systems may also be used.

Figure 18A:
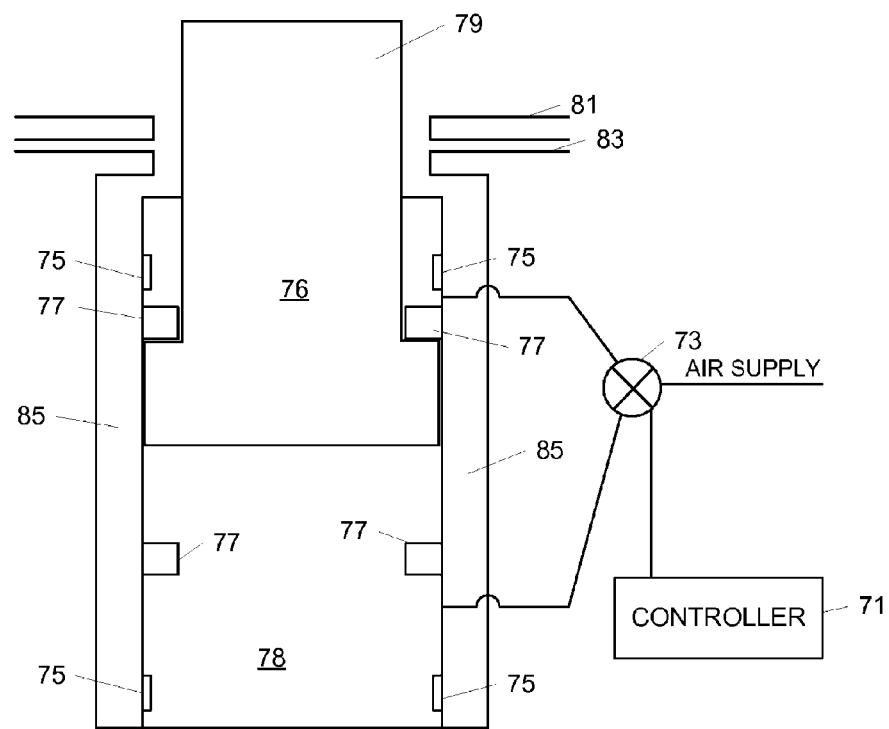
FIGS. 18a and 18b are schematic diagrams depicting a piston/cylinder arrangement for extending and retracting an air deflector according to one or more aspects described herein.
Figure 18B:
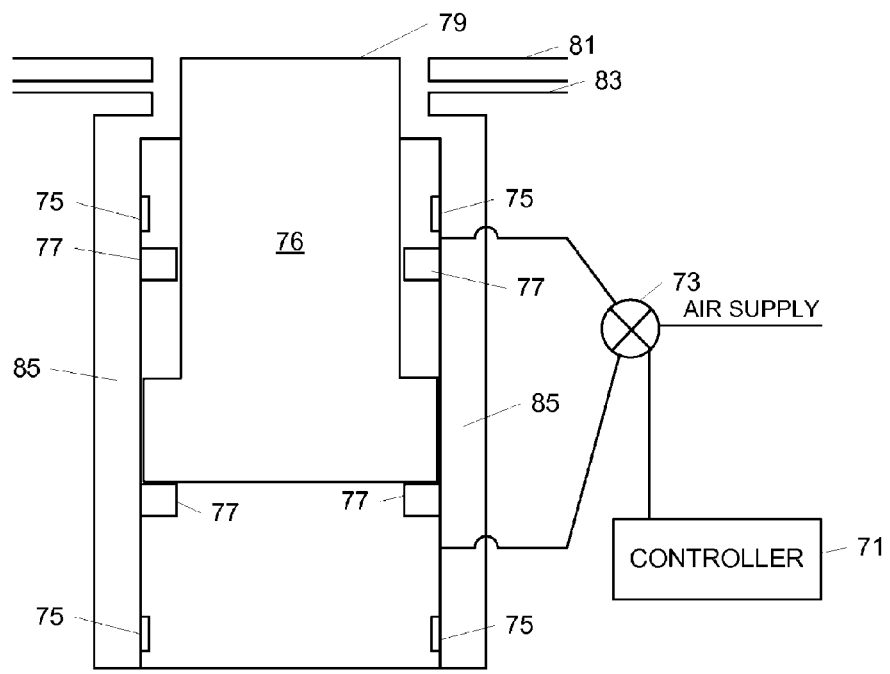

FIGS. 18a and 18b illustrate a piston/cylinder arrangement 76/78, a valve 73 and a controller for extending and retracting an air deflector 79. In the extended position shown in FIG. 18a, air deflector 79 (i.e., a top portion of piston 76) extends past a surface of the gust counteracting module in which the piston/cylinder arrangement 76/78 is housed and an exterior surface 81 of a corresponding airfoil rotor blade (not shown). Stoppers 77 are configured and placed to prevent air deflector 79 and piston 76 from extending past a certain point, thereby controlling an amount by which air deflector 79 may protrude from surface 81. In FIG. 18b, the air deflector 79 is in a retracted position and stoppers 77 prevent piston 76 and deflector 79 from retracting past a certain point. In the retracted position, the top of air deflector 79 may be flush with an exterior surface 81 of the airfoil rotor blade.

Controller 71 is configured to control valve 73 (e.g., a five way valve) to allow the flow of pressurized air into an upper chamber (i.e., a region above the base of the piston 76) or a lower chamber (i.e., a region below the base of the piston 76) of the cylinder 78. By injecting pressurized air into the upper chamber, for example, the piston 76 may be forced down into a retracted position (as shown in FIG. 18b). Injecting air into the lower chamber, on the other hand, forces the deflector 79 and piston 76 upward into an extended position (as shown in FIG. 18a). In one arrangement, pressurized air may be retained in either the lower or the upper chamber to hold deflector 79 and piston 76 in a corresponding position. Accordingly, pressurized air does not need to be continuously injected into a particular chamber to hold the deflector 79 in a particular position in such an arrangement. To subsequently move deflector 79 and piston 76 from an extended to a retracted position, or vice versa, the pressurized air currently retained in either the lower or upper chamber may be evacuated from cylinder 78 through one or more air release valves 75 (or other air release mechanism) and further released from the gust counteracting module through exhaust channel 85. According to one aspect, exhaust channel 85 may allow air to escape into the atmosphere. The air release valves 75 may be electronically controlled, e.g., by controller 71 and/or include mechanical control systems.

The wind gust counteracting devices such as devices 30 may be activated based on readings from one or more of various sensors and/or controller that used sense values to determine whether predetermined thresholds have been exceeded or when an air deflector should be moved based on an algorithm. Such sensors can include one or more of the following: accelerometers, strain gauges, absolute and differential pressure gauges, wind vanes, and wind speed detectors.

Figure 15:
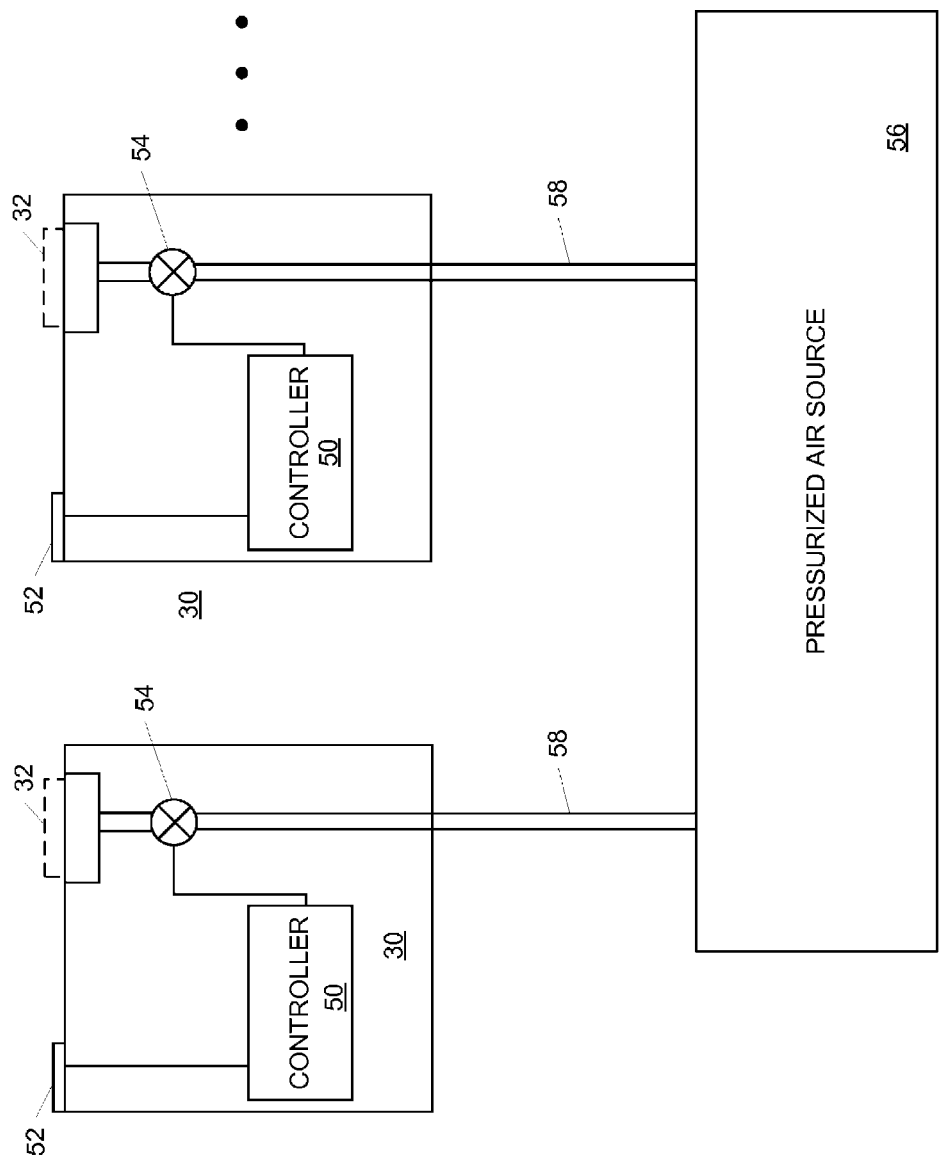
FIG. 15 is a schematic control diagram depicting a locally-controlled embodiment of the gust counteracting device.

As can be seen in FIG. 15, the gust counteracting devices 30 may each be locally-controlled. According to this arrangement, each of gust counteracting devices 30 would have a controller 50 and one or more sensors 52 coupled to the controller 50. Upon determining that a predetermined threshold has been exceeded (e.g., based on a reading from sensor 52), the controller 50 would send a signal to operate the valve 54 to control the flow of pressurized air and move the air deflector 32. According to this arrangement, each of gust counteracting devices 30 may be coupled to a common pressurized air source 56 via a fluid conduit 58.

Figure 16:
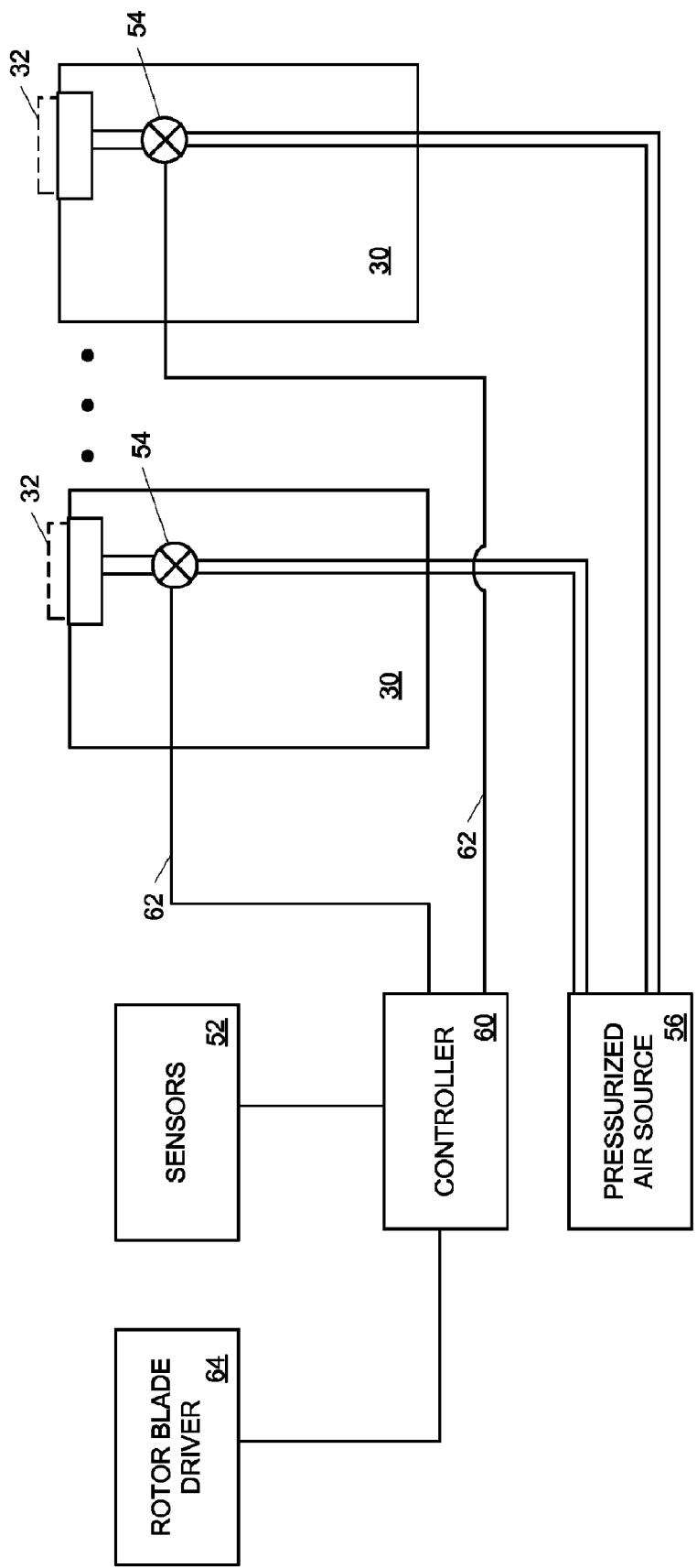
FIG. 16 is a schematic control diagram depicting a centrally-controlled embodiment of the gust counteracting device.

As can be seen in FIG. 16, the gust counteracting devices 30 may also be centrally-controlled. According to this arrangement, each gust counteracting device 30 would be functionally coupled to a common controller 60. Controller 60 could send signals to individually or commonly control the gust counteracting devices 30. Signals may be sent by controller 60 to each gust counteracting device 30 via an optical fiber 62 and/or other wired or wireless signaling mechanisms. Similar to the embodiment of FIG. 15, each of gust counteracting devices 30 may be coupled to a common pressurized air source 56 via a fluid conduit 58. In this centrally-controlled embodiment, there is more flexibility to use additional sensors 52 such as sensors spaced from the gust counteracting device 30. Additionally, the controller 60 may be coupled to the blade rotor drive system 64 to telescopically control the effective length of the rotor blades 10.

Figure 17:
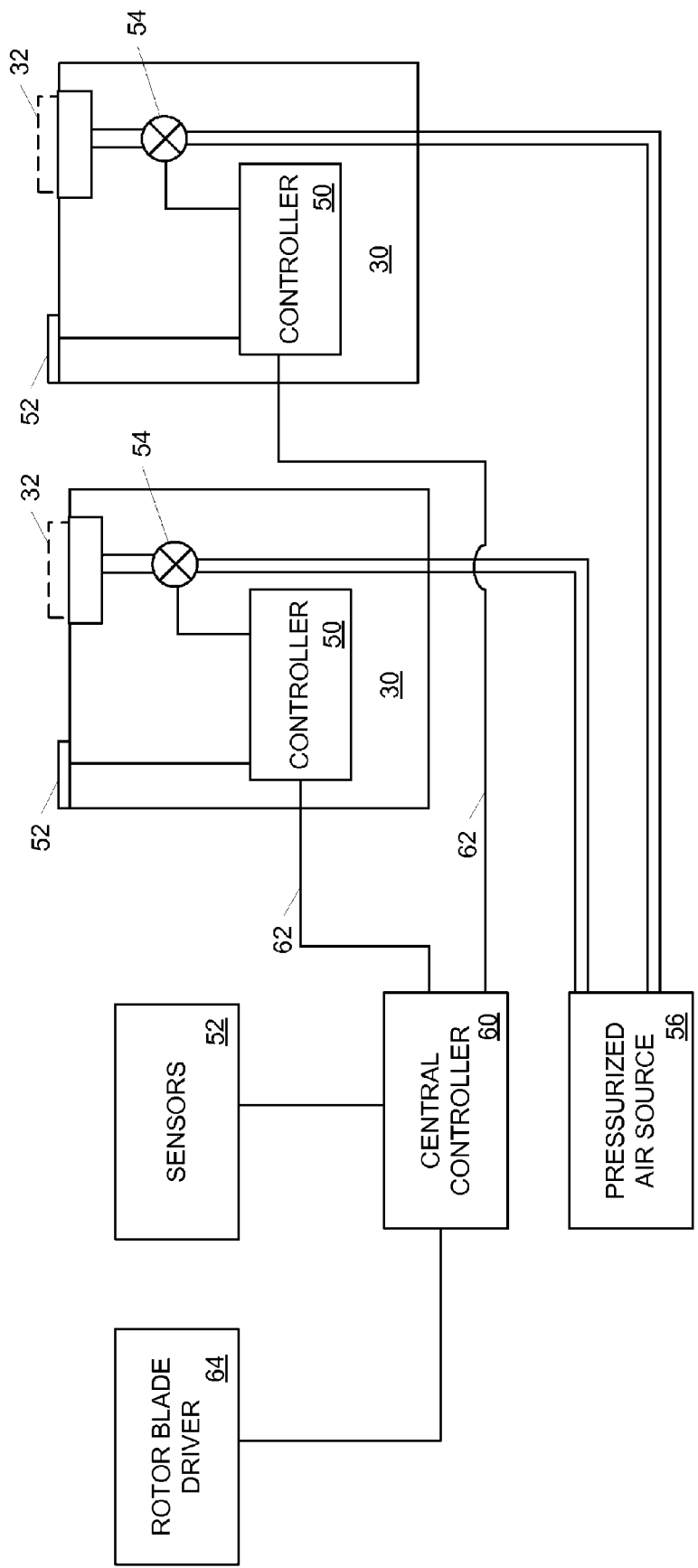
FIG. 17 is a schematic control diagram depicting a distributed control embodiment of the gust counteracting device.

Additionally, in another arrangement, the gust counteracting devices 30 are controlled according to a system containing substantially the details of FIGS. 15 and 16. As illustrated in FIG. 17, the gust counteracting devices 30 may each be controlled in a distributed manner. According to this arrangement, each of gust counteracting devices 30 would have a local controller 50 and one or more sensors 52 coupled to the local controller 50. Thus, each local controller 50 may independently control the extension and retraction of its corresponding deflector 32 based on detected conditions local to each controller 50. Additionally, the local controllers 50 are coupled to a central controller 60. Central controller 60 may send signals to the local controllers 50 to individually or commonly control the gust counteracting devices 30. Each local controller 50 may further send signals to the central controller 60 to inform the central controller 60 of a status of each of the gust counteracting devices 30. The collected status information may then be used by central controller 60 to determine an overall manner or scheme in which to control the local controllers 50 and deflectors 32 (e.g., to reduce load and/or optimize power capture). In this distributed control embodiment, there may also be flexibility to use additional sensors 52 such as sensors spaced from the gust counteracting device 30. Additionally, the controller 60 may be coupled to the blade rotor drive system 64 to telescopically control the effective length of the rotor blades 10. Such a distributed system may also provide redundancy. In each control arrangement, the controllers 50, 60 may be any desired or known control circuitry including but not limited to microprocessors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A wind turbine comprising:
an electrical generator;
a rotor coupled to the electrical generator, the rotor having an airfoil rotor blade, the airfoil rotor blade having a leading side and an air deflector, the air deflector being movable between an extended position in which the air deflector extends outwardly from an exterior surface of the airfoil rotor blade at a location on the leading side and a retracted position in which the air deflector does not extend outwardly from the exterior surface of the airfoil rotor blade,
wherein a top surface of the air deflector, when in the retracted position, forms a portion of the exterior surface of the airfoil rotor blade, and
wherein an entire top surface of the air deflector, when in the extended position, is raised away from the exterior surface of the airfoil rotor blade; and
a controller configured to actively control extension and refraction of the air deflector.

2. The wind turbine of claim 1, wherein the airfoil rotor blade has a high pressure side defined by a first surface of the airfoil rotor blade between a leading edge and a trailing edge of the airfoil rotor blade, and a low pressure side defined by a second surface of the airfoil rotor blade between the leading edge and the trailing edge of the airfoil rotor blade, the second surface forming the low pressure side being opposite of the first surface forming the high pressure side, wherein lift is developed from the high pressure side to the low pressure side when the airfoil rotor blade is rotated, wherein the air deflector extends outwardly from the second surface when in the extended position.

3. The wind turbine of claim 1, wherein the airfoil rotor blade has a high pressure side defined by a first surface of the airfoil rotor blade between a leading edge and a trailing edge of the airfoil rotor blade, and a low pressure side defined by a second surface of the rotor airfoil between the leading edge and the trailing edge of the airfoil rotor blade, the second surface forming the low pressure side being opposite of the first surface forming the high pressure side, wherein lift is developed from the high pressure side to the low pressure side when the airfoil rotor blade is rotated, wherein the air deflector extends outwardly from the first surface when in the extended position.

4. The wind turbine of claim 3, wherein the air deflector is a first air deflector, the wind turbine further comprising a second air deflector being movable between an extended position in which the second air deflector extends outwardly from the exterior surface of the airfoil rotor blade on the leading side and a retracted position in which the second air deflector does not extend outwardly from the exterior surface of the airfoil rotor blade, wherein the second air deflector extends from the first surface when in the extended position.

5. The wind turbine of claim 1, wherein a chord is defined as a straight line between a leading edge and a trailing edge of the airfoil rotor blade, wherein the air deflector, when extended, is located along the chord when measured perpendicularly thereto, between 5% to 25% of the distance from the leading edge to the trailing edge.

6. The wind turbine of claim 5, wherein the air deflector, when extended, is located along the chord when measured perpendicularly thereto, between 5% to 15% of the distance from the leading edge to the trailing edge.

7. The wind turbine of claim 1, wherein the controller is optically coupled to the air deflector through an optical conduit, and
wherein the air deflector is optically triggered by an optical signal sent through the optical conduit.

8. The wind turbine of claim 1, further comprising a pressurized air supply and a valve, wherein the valve is configured to move the air deflector into the extended position by controlling the release of pressurized air from the pressurized air supply.

9. The wind turbine of claim 1, further comprising:
a plurality of airfoil rotor blades, each including an air deflector,
wherein the controller is a central controller configured to control movement of the air deflector of each of the plurality of airfoil rotor blades between an extended position and a retracted position.

10. The wind turbine of claim 1, further comprising a module connected to the airfoil rotor blade, wherein the air deflector is located in the module when in the retracted position.

11. The wind turbine of claim 1, wherein the rotor further includes a plurality of airfoil rotor blades, each airfoil rotor blade having a leading side and an air deflector, each air deflector being movable between an extended position in which the air deflector extends outwardly from an exterior surface of its respective airfoil rotor blade at a location on the leading side and a retracted position in which the air deflector does not extend outwardly from the exterior surface of its respective airfoil rotor blade, each airfoil rotor blade further being longitudinally-telescopic and having a base portion and a tip portion longitudinally-movable with respect to the base portion; and
wherein for each airfoil rotor blade, a chord is defined as a straight line between a leading edge and a trailing edge of the airfoil rotor blade, wherein each air deflector, when extended, is located along the chord of its respective airfoil rotor blade when measured perpendicularly thereto, between 5% to 25% of the distance from the leading edge to the trailing edge.

12. A wind turbine comprising:
an electrical generator; and
a longitudinally-telescopic rotor blade coupled to the electrical generator, the longitudinally-telescopic rotor blade having a base portion and a tip portion longitudinally-movable with respect to the base portion, the rotor blade having an actively-controllable air deflector, the air deflector being movable between an extended position in which the air deflector extends outwardly from an exterior surface of the rotor blade and a retracted position in which the air deflector does not extend outwardly from the exterior surface of the rotor blade,
wherein a top surface of the air deflector, when in the retracted position, forms a portion of the exterior surface of the rotor blade, and
wherein an entire top surface of the air deflector, when in the extended position, is raised away from the exterior surface of the rotor blade.

13. The wind turbine of claim 12, wherein the air deflector is located on the base portion of the rotor blade.

14. The wind turbine of claim 12, wherein the air deflector is located on the movable tip portion of the rotor blade.

15. The wind turbine of claim 14, wherein the air deflector is a first air deflector, the wind turbine further comprising a second air deflector being movable between an extended position in which the second air deflector extends outwardly from the exterior surface of the rotor blade and a retracted position in which the second air deflector does not extend outwardly from the exterior surface of the rotor blade, the second air deflector being located on the base portion of the rotor blade.

16. The wind turbine of claim 12, further comprising a plurality of a longitudinally-telescopic rotor blade coupled to the electrical generator, each longitudinally-telescopic rotor blade having a base portion and a tip portion longitudinally-movable with respect to the base portion, each airfoil rotor blade further having an air deflector and an air deflector driver, the air deflector being movable between an extended position in which the air deflector extends outwardly from an exterior surface of its respective rotor blade and a retracted position in which the air deflector does not extend outwardly from the exterior surface of its respective rotor blade, the wind turbine further comprising a pressurized fluid source and a plurality of conduits, each conduit operatively coupling the pressurized fluid source to a respective air deflector driver.

17. The wind turbine of claim 12, further comprising a controller and a sensor operatively coupled to the controller, the controller configured to transmit a signal to move the air deflector from the refracted position to the extended position in response to a detection of a wind gust.

18. A wind turbine comprising:
an electrical generator; and
a rotor coupled to the electrical generator, the rotor having at least one airfoil rotor blade, the airfoil rotor blade having a plurality of physically distinct modules attached thereto, each module having an air deflector being movable between an extended position in which the air deflector extends outwardly from an exterior surface of the airfoil rotor blade and a retracted position in which the air deflector does not extend outwardly from the exterior surface of the airfoil rotor blade, the modules each further including a controller and a sensor, wherein the controller is configured to send a signal to move the air deflector from the retracted position to the extended position based at least in part on a condition sensed by the sensor.

19. The wind turbine of claim 18, further comprising a pressurized air supply, wherein each module further includes a valve coupled to the pressurized air supply through an air conduit, the valve configured to pneumatically control movement of the air deflector to at least one of the extended position and the refracted position.

20. The wind turbine of claim 18, wherein the airfoil rotor blade includes a base portion and a tip portion, wherein the tip portion is capable of extending from and retracting into the base portion.

21. The wind turbine of claim 18, further comprising a central controller different from the controller included in each of the modules, wherein the central controller is coupled to each of the plurality of physically distinct modules.

* * * * *